US008386489B2

(12) United States Patent
Peoples et al.

(10) Patent No.: US 8,386,489 B2
(45) Date of Patent: Feb. 26, 2013

(54) APPLYING FORMAL CONCEPT ANALYSIS TO VALIDATE EXPANDED CONCEPT TYPES

(75) Inventors: Bruce E. Peoples, State College, PA (US); Michael R. Johnson, State College, PA (US); Jonathon P. Smith, Port Matilda, PA (US)

(73) Assignee: Raytheon Company, Waltham, MA (US)

( * ) Notice: Subject to any disclaimer, the term of this patent is extended or adjusted under 35 U.S.C. 154(b) by 401 days.

(21) Appl. No.: 12/266,724

(22) Filed: Nov. 7, 2008

(65) Prior Publication Data

US 2010/0121884 A1 May 13, 2010

(51) Int. Cl.
*G06F 17/30* (2006.01)
(52) U.S. Cl. ...................................................... 707/738
(58) Field of Classification Search .................. 707/706, 707/71, 736, 999.003, 999.01, 738; 709/203
See application file for complete search history.

(56) References Cited

U.S. PATENT DOCUMENTS

| 4,964,063 | A | * | 10/1990 | Esch ................................ 706/53 |
| 6,169,986 | B1 | | 1/2001 | Bowman et al. |
| 6,263,335 | B1 | | 7/2001 | Paik et al. |
| 6,523,028 | B1 | | 2/2003 | DiDomizio et al. |
| 6,678,677 | B2 | | 1/2004 | Roux et al. |
| 6,847,979 | B2 | | 1/2005 | Allemang et al. |
| 7,031,909 | B2 | | 4/2006 | Mao et al. |
| 7,139,755 | B2 | | 11/2006 | Hammond |
| 7,225,183 | B2 | | 5/2007 | Gardner |
| 7,428,529 | B2 | | 9/2008 | Zeng et al. |
| 7,539,619 | B1 | | 5/2009 | Seligman et al. |
| 7,555,472 | B2 | * | 6/2009 | Craig et al. ..................... 706/50 |
| 7,685,118 | B2 | * | 3/2010 | Zhang ............................. 706/55 |
| 7,761,298 | B1 | | 7/2010 | Pereira et al. |
| 7,853,555 | B2 | | 12/2010 | Peoples et al. |
| 7,882,143 | B2 | | 2/2011 | Smyros et al. |
| 7,991,608 | B2 | | 8/2011 | Johnson et al. |
| 2002/0002454 | A1 | | 1/2002 | Bangalore et al. |
| 2002/0022955 | A1 | | 2/2002 | Troyanova et al. |
| 2002/0022956 | A1 | | 2/2002 | Ukrainczyk et al. |
| 2002/0107844 | A1 | * | 8/2002 | Cha et al. ......................... 707/3 |
| 2002/0111941 | A1 | * | 8/2002 | Roux et al. ....................... 707/3 |
| 2003/0028367 | A1 | | 2/2003 | Chalabi |
| 2003/0049592 | A1 | | 3/2003 | Park |
| 2003/0050915 | A1 | | 3/2003 | Allemang et al. |
| 2003/0177000 | A1 | | 9/2003 | Mao et al. |
| 2003/0229497 | A1 | | 12/2003 | Wilson et al. |
| 2004/0024739 | A1 | | 2/2004 | Copperman et al. |
| 2004/0067471 | A1 | | 4/2004 | Bennett |
| 2004/0093328 | A1 | * | 5/2004 | Damle .............................. 707/3 |
| 2004/0107088 | A1 | | 6/2004 | Budzinski |

(Continued)

OTHER PUBLICATIONS

Rodriguez et al., Determining Semantic Similarity among Entity Classes from Different Ontologies, Apr. 2003.*

(Continued)

*Primary Examiner* — William Spieler
(74) *Attorney, Agent, or Firm* — Daly, Crowley, Mofford & Durkee, LLP

(57) ABSTRACT

According to one embodiment, attributes associated with a concept type of a query conceptual graph are received. A potentially conceptually similar term is received from an onomasticon. The potentially conceptually similar term is validated according to the attributes. According to another embodiment, attributes associated with a concept type of a document conceptual graph are received. A potentially conceptually similar term is received from an onomasticon. The potentially conceptually similar term is validated according to the attributes.

16 Claims, 5 Drawing Sheets

U.S. PATENT DOCUMENTS

| | | | |
|---|---|---|---|
| 2004/0236729 A1 | 11/2004 | Dingledine et al. | |
| 2006/0074832 A1 | 4/2006 | Gardner et al. | |
| 2006/0184516 A1 | 8/2006 | Ellis | |
| 2006/0235843 A1 | 10/2006 | Musgrove et al. | |
| 2007/0005343 A1 | 1/2007 | Sandor et al. | |
| 2007/0136251 A1 | 6/2007 | Colledge et al. | |
| 2007/0250493 A1 | 10/2007 | Peoples et al. | 707/4 |
| 2007/0294223 A1 | 12/2007 | Gabrilovich et al. | |
| 2008/0033932 A1 | 2/2008 | DeLong et al. | |
| 2008/0270120 A1 | 10/2008 | Pestian et al. | |
| 2008/0270138 A1 | 10/2008 | Knight et al. | |
| 2009/0012928 A1 | 1/2009 | Lussier et al. | |
| 2009/0063473 A1 | 3/2009 | Van Den Berg et al. | |
| 2009/0089047 A1 | 4/2009 | Pell et al. | |
| 2009/0171876 A1 | 7/2009 | Tirri | |
| 2009/0254543 A1 | 10/2009 | Ber et al. | |
| 2009/0259459 A1 | 10/2009 | Ceusters et al. | |
| 2010/0070449 A1 | 3/2010 | Arnold et al. | |
| 2010/0153368 A1 | 6/2010 | Peoples et al. | |
| 2010/0153369 A1 | 6/2010 | Peoples et al. | |
| 2010/0161669 A1 | 6/2010 | Peoples et al. | |
| 2010/0223276 A1 | 9/2010 | Al-Shameri et al. | |
| 2010/0287179 A1 | 11/2010 | Peoples et al. | |
| 2011/0040774 A1 | 2/2011 | Peoples et al. | |

OTHER PUBLICATIONS

Patent Application entitled, "*Expanding Concept Types in Conceptual Graphs*", 28 pages specification, claims and abstract, 3 pages of drawings, inventors Bruce E. Peoples et al., filed Nov. 7, 2008.
USPTO; Office Action dated May 11, 2011 for U.S. Appl. No. 12/266,671, filed Nov. 7, 2008 in the name of Bruce E. Peoples, Examiner Thuy T. Bui, 12 pages, May 11, 2011.
Response filed Aug. 9, 2011; to Office Action dated May 11, 2011; for U.S. Appl. No. 12/266,671; 13 pages.
Office Action dated Sep. 16, 2011; for U.S. Appl. No. 12/266,617; 12 pages.
RCE and Response filed Nov. 16, 2011; to Office Action dated Sep. 16, 2011; for U.S. Appl. No. 12/266,617; 15 pages.
Response filed Feb. 16, 2012; to Office Action dated Sep. 16, 2011; for U.S. Appl. No. 12/266,617; 16 pages.
Office Action dated Aug. 5, 2011; for U.S. Appl. No. 12/342,580; 11 pages.
Response filed Nov. 7, 2011; to Office Action dated Aug. 5, 2011; for U.S. Appl. No. 12/342,580; 11 pages.
Final Office Action dated Jan. 26, 2012; for U.S. Appl. No. 12/342,580; 17 pages.
Office Action dated Aug. 2, 2011; for U.S. Appl. No. 12/335,260; 12 pages.
Response filed Nov. 2, 2011; for Office Action dated Aug. 2, 2011; for U.S. Appl. No. 12/335,260; 12 pages.
Office Action dated Jan. 20, 2012; for U.S. Appl. No. 12/335,260; 12 pages.
Response filed Mar. 22, 2012; for Office Action dated Jan. 20, 2012; for U.S. Appl. No. 12/335,260; 14 pages.
Office Action dated Mar. 29, 2011 for U.S. Appl. No. 12/355,283;13 pages.
Response filed Jul. 29, 2011; for Office Action dated Mar. 29, 2011 for U.S. Appl. No. 12/355,283; 12 pages.
Final Office Action dated Oct. 31, 2011; for U.S. Appl. No. 12/335,283; 14 pages.
Response filed Nov. 30, 2011; to Office Action dated Oct. 31, 2011; for U.S. Appl. No. 12/335,283; 17 pages.
Advisory Action dated Dec. 9, 2011; for U.S. Appl. No. 12/355,283; 13 pages.
RCE with Response to Advisory Action filed on Feb. 16, 2012; for Advisory Action dated Dec. 9, 2011; for U.S. Appl. No. 12/355,283; 24 pages.
Office Action dated May 26. 2011; for U.S. Appl. No. 12/541,244; 24 pages.
Response filed Aug. 25, 2011; to Office Action dated May 26, 2011; for U.S. Appl. No. 12/541,244; 14 pages.
Final Office Action dated Sep. 21, 2011; for U.S. Appl. No. 12/541,244; 24 pages.
RCE and Response filed Nov. 30, 2011; to Final Office Action dated Sep. 21, 2011; for U.S. Appl. No. 12/541,244; 16 pages.
Office Action dated Dec. 30, 2012; for U.S. Appl. No. 12/541,244; 30 pages.
Response filed Mar. 15, 2012; to Office Action dated Dec. 30, 2012; for U.S. Appl. No. 12/541,244; 17 pages.
Request for Continued Examination and Response to Final Office Action filed on Feb. 16, 2012; for Final Office Action dated Sep. 1, 2011; for U.S. Appl. No. 12/266,671; 13 pages.
Request for Continued Examination and Response to Final Office Action filed on Apr. 3, 2012; for Final Office Action dated Jan. 26, 2012; for U.S. Appl. No. 12/342,580; 10 pages.
Office Action dated Apr. 26, 2012; for U.S. Appl. No. 12/335,260; 17 pages.
Final Office Action dated Apr. 23, 2012; for U.S. Appl. No. 12/541,244; 29 pages.
Office Action dated Aug. 1, 2012; for U.S. Appl. No. 12/266,671; 18 pages.
U.S. Appl. No. 12/335,213, filed Dec. 15, 2008.
U.S. Appl. No. 12/335,239, filed Dec. 15, 2008.

\* cited by examiner

APPLYING FORMAL CONCEPT ANALYSIS TO VALIDATE EXPANDED CONCEPT TYPES

TECHNICAL FIELD

This invention relates generally to the field of information management and more specifically to applying formal concept analysis to validate expanded concept types.

BACKGROUND

A corpus of data may hold a large amount of information, yet finding relevant information may be difficult. Key word searching is the primary technique for finding information. In certain situations, however, known techniques for keyword searching are not effective in locating relevant information.

SUMMARY OF THE DISCLOSURE

In accordance with the present invention, disadvantages and problems associated with previous techniques for conceptual graph searching documents may be reduced or eliminated.

According to one embodiment, attributes associated with a concept type of a query conceptual graph are received. A potentially conceptually similar term is received from an onomasticon. The potentially conceptually similar term is validated according to the attributes. According to another embodiment, attributes associated with a concept type of a document conceptual graph are received. A potentially conceptually similar term is received from an onomasticon. The potentially conceptually similar term is validated according to the attributes.

Certain embodiments of the invention may provide one or more technical advantages. A technical advantage of one embodiment may be that a query conceptual graph generated for a search query may include terms that represent concept types in the graph. A set of terms conceptually similar to the graph terms may be identified and used to perform the search. The conceptually similar terms may be validated before use.

Another technical advantage of one embodiment may be that a document conceptual graph may be generated for a document. The document conceptual graph may include terms that represent concept types in the graph. A set of terms conceptually similar to the graph terms may be identified and used to represent the document. The conceptually similar terms may be validated before use.

Another technical advantage of one embodiment may be that valid conceptually similar terms of a document conceptual graph may be compared with valid conceptually similar terms of a search conceptual graph. The document may be selected as a result of the search if the valid conceptually similar terms of the query conceptual graph match the valid conceptually similar terms of the document conceptual graph.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 5 of the drawings, like numerals being used for like and corresponding parts of the various drawings.

Figure 1:
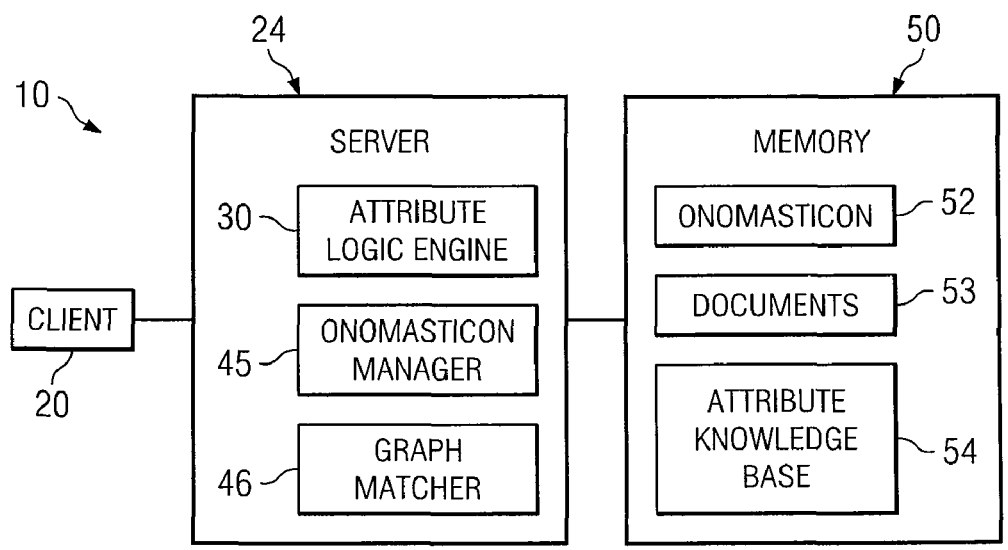
FIG. 1 illustrates one embodiment of a system configured to validate terms for concept types in conceptual graphs.

FIG. 1 illustrates one embodiment of a system 10 configured to validate potential conceptually similar terms representing concept types in conceptual graphs. In certain embodiments, system 10 validates potential conceptually similar terms representing concept types in an existing query conceptual graph that may represent a search query. The existing query conceptual graph may include previously generated conceptual graph terms stored in onomasticon 52 that potentially represent a concept type. A set of validated terms conceptually similar to concept types in query conceptual graphs may be identified and used to perform a search.

In certain embodiments, system 10 validates potential conceptually similar terms representing concept types contained in an existing document conceptual graph that may represent a document. The existing document conceptual graph may include previously generated conceptual graph terms stored in onomasticon 52 that potentially represent a concept type. A set of validated terms conceptually similar to concept types in document conceptual graphs may be identified and used to represent the document.

In certain embodiments, the validated conceptually similar terms representing concept types found in document conceptual graphs may be compared with validated conceptually similar terms representing concept types found in query conceptual graphs of a search. The document may be selected as a result of the search if the validated terms found in concept types in document conceptual graphs match validated terms found in query concept graphs.

In the illustrated embodiment, system 10 includes a client 20, a server 24, and a memory 50, one or more of which may be embodied as one or more apparatuses. Server 24 includes an attribute logic engine 30, an onomasticon manager 45, and a graph matcher 46. Memory 50 includes an onomasticon 52, documents 53, and an attribute knowledge base 54.

In particular embodiments, client 20 may send input to system 10 and/or receive output from system 10. In particular examples, a system may use client 20 to send input to system 10 and/or receive output from system 10. In particular examples, a user may use client 20 to send input to system 10 and/or receive output from system 10. In particular embodiments, client 20 may provide output, for example, display, print, or vocalize output, reported by server 24, such as by graph matcher 46.

In particular embodiments, client 20 may send an input message to server 24 to initiate validation of potential conceptually similar terms representing concept types contained in either an existing query conceptual graph or an existing document conceptual graph. A term may comprise any suitable sequence of characters, for example, one or more letters, one or more numbers, and/or one or more other characters. An example of a term is a word.

Server 24 stores system logic (for example, software and/or hardware) that may be used to perform the operations of system 10. In the illustrated example, server 24 includes attribute logic engine 30, onomasticon manager 45, and graph matcher 46.

In particular embodiments, attribute logic engine 30 determines if existing potential conceptually similar terms stored in onomasticon 52 representing concept types mapped to existing concept types in an existing query conceptual graph or an existing document conceptual graph are valid for use by the system. In particular embodiments, attribute knowledge base 54 includes attributes that describe the term that represents a concept type in an existing conceptual graph. An existing conceptual graph may be a graph that includes concept types expressed as terms (for example, specific term representations of concept types) and the relationships among the concept types. Examples of existing conceptual graphs are described with reference to FIGS. 2A and 3A.

A component of system 10 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage media. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to system 10 without departing from the scope of the invention. The components of system 10 may be integrated or separated. Moreover, the operations of system 10 may be performed by more, fewer, or other components. For example, the operations of attribute logic engine 30 and onomasticon manager 45 may be performed by one component, or the operations of onomasticon manager 45 may be performed by more than one component. Additionally, operations of system 10 may be performed using any suitable logic comprising software, hardware, and/or other logic. As used in this document, "each" refers to each member of a set or each member of a subset of a set.

Figure 2A:
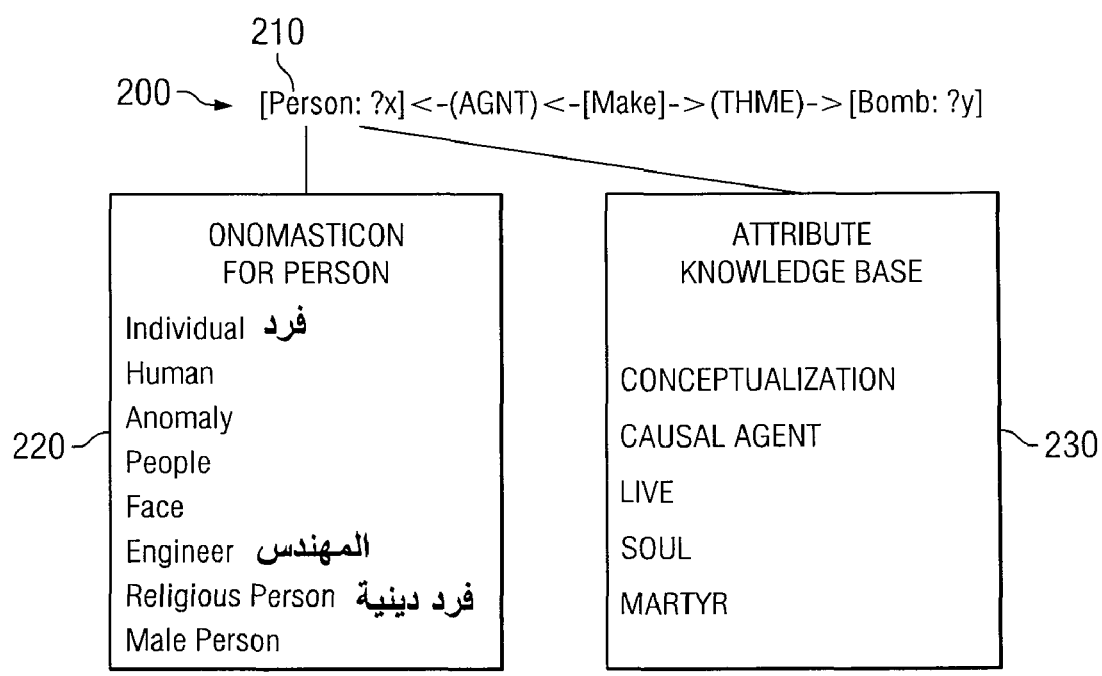
FIGS. 2A and 2B illustrate examples of a query conceptual graph, an onomasticon, an attribute knowledge base, an onomasticon manager, and an attribute logic engine.
Figure 2B:
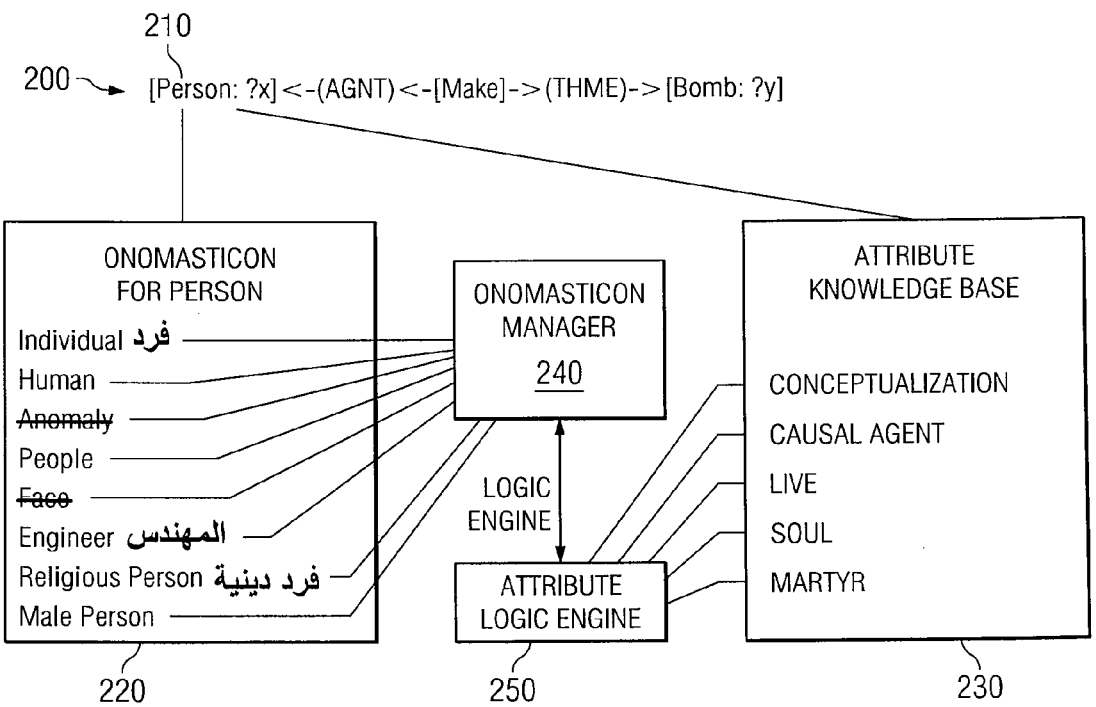

FIGS. 2A and 2B illustrate examples of a query conceptual graph 200, an onomasticon 220, an attribute knowledge base 230, an onomasticon manager 240, and an attribute logic engine 250. Conceptual graph 200 includes concept types, such as concept type [Person] 210 represented by the term "Person". Concept types may be expressed as subjects, direct objects, verbs, or any suitable part of language. In particular embodiments, the concepts and the relationships among the concepts of a conceptual graph may be expressed in text. In certain embodiments, square brackets may be used to indicate concept nodes that include concept types.

Onomasticon 220 may be used to store previously generated terms that potentially represent a concept type in graph 200. In particular embodiments, onomasticon 220 stores conceptually similar English and foreign language terms, such as Arabic terms for the existing concept type [Person] 210. In the illustrated example, these terms may include Individual, Human, Anomaly, People, Face, Religious Person, Engineer, Male Person, فرد (Individual) فرد دينية (Religious Person), and المهندس (Engineer).

Attribute knowledge base 230 includes existing attributes for an existing term representing existing concept type 210 in an existing query conceptual graph 200. Attributes may be expressed as subjects, direct objects, verbs, or any suitable part of language. In the illustrated example, attribute knowledge base 230 includes the attributes conceptualization, causal agent, live, soul, and martyr.

The existing attributes may be mapped to an existing term representing an existing concept type described by the attributes. For example, existing concept type [Person] 210 is described by attributes conceptualization, causal agent, live, soul, and martyr, so these attributes are mapped to the existing term representing existing concept type [Person] 210.

Onomasticon manager 240, onomasticon 220, and attribute logic engine 250 may validate a term in onomasticon 220 by determining whether the term is conceptually similar to an existing term of an existing concept type of an existing conceptual graph. For example, a potentially conceptually similar term may be regarded as conceptually similar to the existing term if the attributes of the existing term describe the potentially conceptually similar term. For example, a potentially conceptually similar term may be regarded as a conceptually similar term if a certain percentage of the existing attributes adequately define and/or can be mapped to the potentially conceptually similar term. Any suitable percentage may be used, for example, 50% to 75%, 75% to 80%, 80% to 90%, or 90% to 100% (all).

In particular embodiments, attribute logic engine 250 retrieves the existing attributes in attribute knowledge base 230 for the existing concept type. Onomasticon manager 240 retrieves from onomasticon 220 a potentially conceptually similar term for a term in the existing concept type and provides the potentially conceptually similar term to attribute logic engine 250. Attribute logic manager 250 determines if the attributes adequately define and can be mapped to the potentially conceptually similar term. Attribute logic manager 250 notifies onomasticon manager 240 if the attributes cannot define or map to the potentially conceptually similar term. In response, onomasticon manager 240 may delete the potentially conceptually similar term from onomasticon 220.

In the illustrated example, a term in onomasticon 220 may be validated by determining whether the term is conceptually similar to "Person" of [Person]. Attribute logic engine 250 retrieves existing attributes mapped to [Person]: conceptualization, causal agent, live, soul, and martyr. Onomasticon manager 240 retrieves "Anomaly" from onomasticon 220 as a potentially conceptually similar term for "Person" and provides "Anomaly" to attribute logic engine 250.

Attribute logic engine 250 determines the attributes live, soul, and martyr do not adequately define and/or cannot be mapped to "Anomaly," and notifies onomasticon manager 240 that the attributes do not define or map to "Anomaly." Onomasticon manager 240 removes "Anomaly" from onomasticon 220 as a conceptually similar term for "Person."

In the illustrated example, attribute logic engine 250 retrieves the existing attributes mapped to [Person]. Onomasticon manager 240 retrieves from onomasticon 220 "Human" as a possible conceptually similar term for "Person" and provides "Human" to attribute logic engine 250. Attribute logic engine 250 determines that the attributes, conceptualization, causal agent, live, soul, and martyr adequately define and can be mapped to "Human". "Human" contained in onomasticon 220 remains as a conceptually similar term for "Person."

Figure 3A:
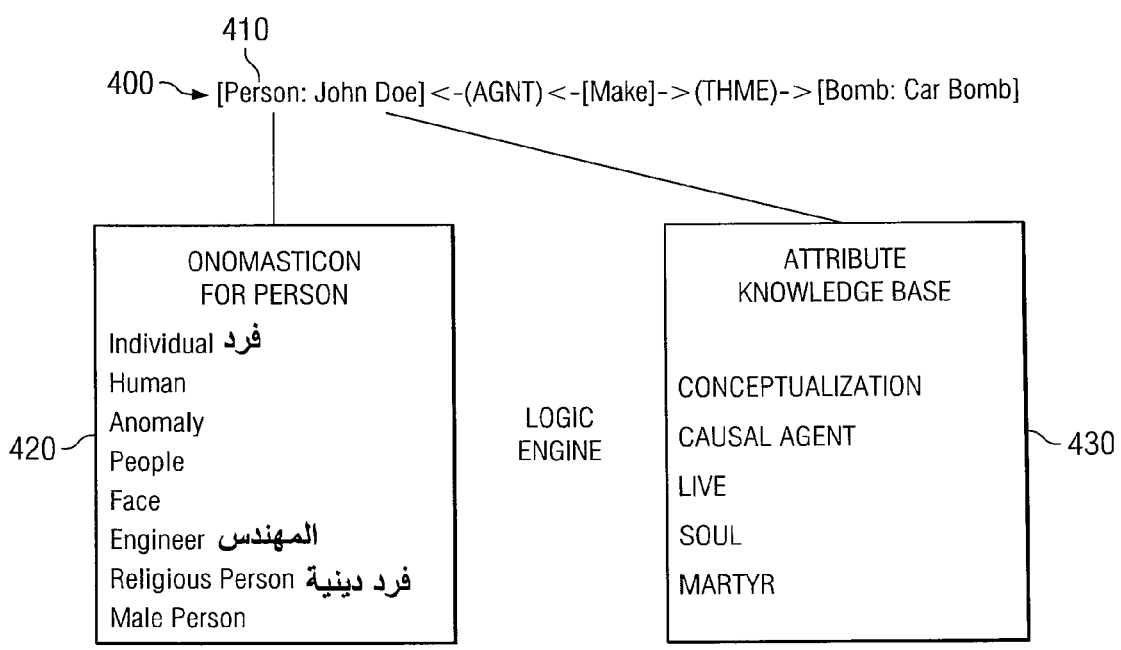
FIGS. 3A and 3B illustrate examples of a document conceptual graph, an onomasticon, an attribute knowledge base, an onomasticon manager, and an attribute logic engine.
Figure 3B:
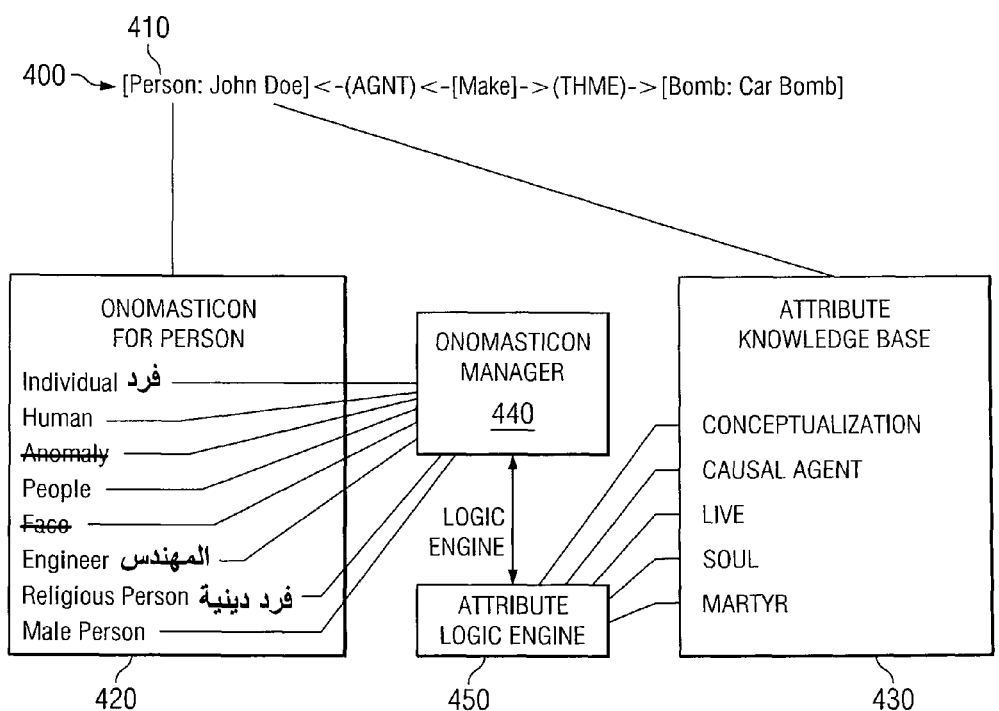

FIGS. 3A and 3B illustrate examples of a document conceptual graph 400, an onomasticon 420, an attribute knowledge base 430, an onomasticon manager 440, and an attribute logic engine 450. Conceptual graph 400 includes concept types, such as concept type [Person] 410 represented by the term "Person". Onomasticon 420 may be used to store previously generated terms that represent a concept type in graph 400 and may be substantially similar to onomasticon 220. Attribute knowledge base 430 includes existing attributes for an existing term representing existing concept type 410 in an existing document conceptual graph 400 and may be substantially similar to attribute knowledge base 230. Onomasticon manager 440 and an attribute logic engine 450 may be substantially similar to onomasticon manager 240 and an attribute logic engine 250, respectively.

Figure 4:
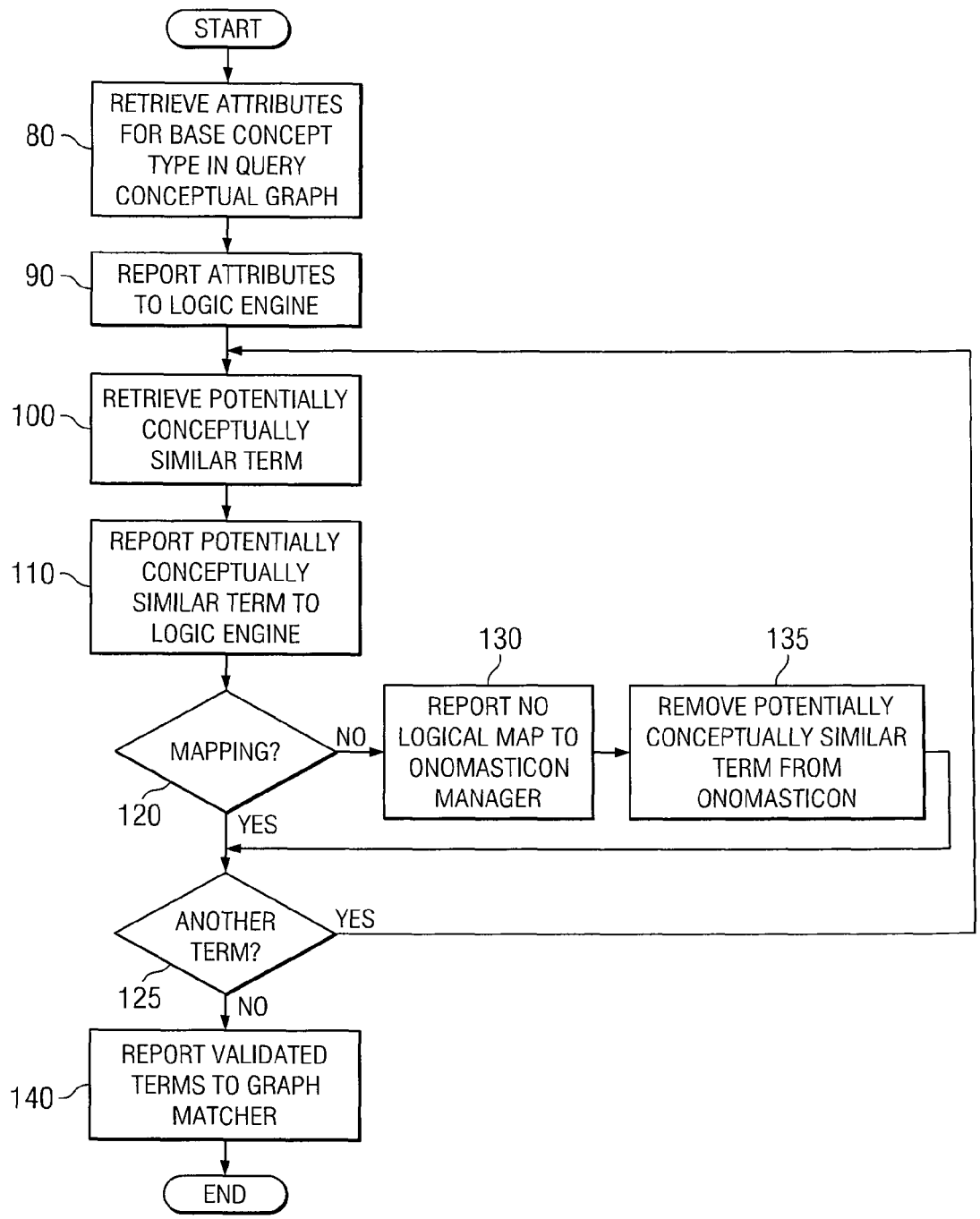
FIG. 4 illustrates an example of a method for validating terms representing concept types of a query conceptual graph.

FIG. 4 illustrates an example of a method for validating existing expanded terms in an existing onomasticon. In the example, the method is performed for query conceptual graph 200, using onomasticon 220, attribute knowledge base 230, onomasticon manager 240, and attribute logic engine 250 of FIGS. 2A and 2B as onomasticon 52, attribute knowledge base 54, onomasticon manager 45, and attribute logic engine 30 described with reference to FIG. 4.

In the example, attribute logic engine 30 requests retrieval of the existing attributes for "Person" from attribute knowledge base 54 at step 80. As described with reference to FIGS. 2A and 2B, the existing attributes include conceptualization, causal agent, live, soul, and martyr. Attribute knowledge base 54 reports the attributes at step 90.

Onomasticon manager 45 retrieves a potentially conceptually similar term for "Person" from onomasticon 52 at step 100. Onomasticon manager 45 reports the potentially conceptually similar term to attribute logic engine 30 at step 110.

At step 120, attribute logic engine 30 performs a logic function to determine if a certain percentage of the existing attributes adequately define and/or can be mapped to the potentially conceptually similar term. If the certain percentage of existing attributes adequately define and/or can be mapped to the potentially conceptually similar term, the term is considered to be a conceptually similar term for an existing term for "Person," and the method then proceeds to step 125.

If the certain percentage of existing attributes do not adequately define and/or cannot be mapped to the potentially conceptually similar, the term is not considered to be a conceptually similar term for an existing term for "Person," and the method proceeds to step 130. Attribute logic engine 30 reports that there is no adequate definition or mapping to onomasticon manager 45 to initiate removal of the term from onomasticon 52. Onomasticon manager 45 removes the term at step 135. The method then proceeds to step 125.

Another term may be validated at step 125. If another term is to be validated, attribute logic engine 30 requests onomasticon manager 45 to provide a term contained in onomasticon 52 that has not been validated, and the method returns to step 100. If there is no other term to be validated, the method proceeds to step 140.

Onomasticon manager 45 reports the validated conceptually similar terms to graph matcher 46 at step 140. The validated conceptually similar terms may be used to determine matches between existing query conceptual graphs and existing document conceptual graphs. The method then ends.

Figure 5:
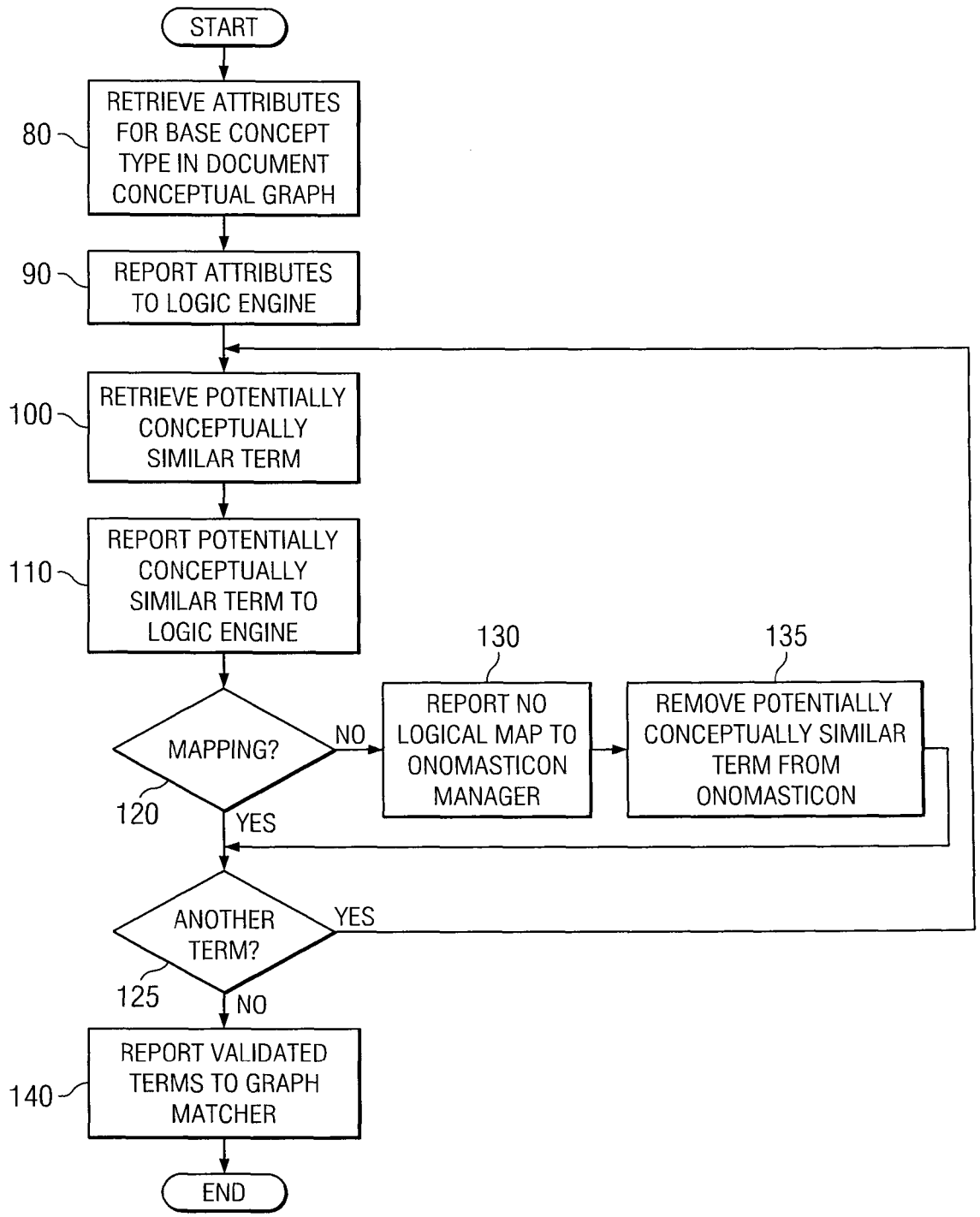
FIG. 5 illustrates an example of a method for validating terms representing concept types of a document conceptual graph.

FIG. 5 illustrates another example of a method for validating existing expanded terms in an existing onomasticon. In the example, the method is performed for document conceptual graph 400, using onomasticon 420, attribute knowledge base 430, onomasticon manager 440, and attribute logic engine 450 of FIGS. 3A and 3B as onomasticon 52, attribute knowledge base 54, onomasticon manager 45, and attribute logic engine 30. The steps may be substantially similar to those described with reference to FIG. 4.

Modifications, additions, or omissions may be made to the methods described herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
   receiving a plurality of attributes associated with a concept type of a query conceptual graph stored in a computer-readable medium;
   receiving a potentially conceptually similar term from an onomasticon corresponding to the concept type; and
   validating, by an apparatus, the potentially conceptually similar term according to the plurality of attributes, the validating comprising:
      determining, from the received attributes, a percentage of the received attributes that map to the potentially conceptually similar term;
      determining that the potentially conceptually similar term is conceptually similar to the concept type if the determined percentage is equal to or greater than a predetermined percentage; and
      determining that the potentially conceptually similar term is not conceptually similar to the concept type if the determined percentage is less than the predetermined percentage.

2. The method of claim 1, further comprising: reporting that the potentially conceptually similar term is not validated to initiate removal of the potentially conceptually similar term from the onomasticon.

3. The method of claim 1, further comprising:
   determining that the potentially conceptually similar term is validated; and
   reporting the potentially conceptually similar term to a graph matcher.

4. The method of claim 1, further comprising:
   determining whether the potentially conceptually similar term is validated;
   if the potentially conceptually similar term is validated, reporting the potentially conceptually similar term to a graph matcher; and
   if the potentially conceptually similar term is not validated, initiating removal of the potentially conceptually similar term from the onomasticon.

5. A computer-readable non-transitory medium having computer-executable instructions, when executed by a computer configured to:
  receive a plurality of attributes associated with a concept type of a query conceptual graph;
  receive a potentially conceptually similar term from an onomasticon corresponding to the concept type; and
  validate the potentially conceptually similar term according to the plurality of attributes, the validating comprising:
    determining, from the received attributes, a percentage of the received attributes that map to the potentially conceptually similar term;
    determining that the potentially conceptually similar term is conceptually similar to the concept type if the determined percentage is equal to or greater than a predetermined percentage; and
    determining that the potentially conceptually similar term is not conceptually similar to the concept type if the determined percentage is less than the predetermined percentage.

6. The computer-readable medium of claim 5, the instructions further configured to: report that the potentially conceptually similar term is not validated to initiate removal of the potentially conceptually similar term from the onomasticon.

7. The computer-readable medium of claim 5, the instructions further configured to: determine that the potentially conceptually similar term is validated; and report the potentially conceptually similar term to a graph matcher.

8. The computer-readable medium of claim 5, the instructions further configured to:
  determine whether the potentially conceptually similar term is validated;
  if the potentially conceptually similar term is validated, report the potentially conceptually similar term to a graph matcher; and
  if the potentially conceptually similar term is not validated, initiate removal of the potentially conceptually similar term from the onomasticon.

9. A method comprising:
  receiving a plurality of attributes associated with a concept type of a document conceptual graph stored in a computer-readable medium;
  receiving a potentially conceptually similar term from an onomasticon corresponding to the concept type; and
  validating, by an apparatus, the potentially conceptually similar term according to the plurality of attributes, the validating comprising:
    determining, from the received attributes, a percentage of the received attributes that map to the potentially conceptually similar term;
    determining that the potentially conceptually similar term is conceptually similar to the concept type if the determined percentage is equal to or greater than a predetermined percentage; and
    determining that the potentially conceptually similar term is not conceptually similar to the concept type if the determined percentage is less than the predetermined percentage.

10. The method of claim 9, further comprising: reporting that the potentially conceptually similar term is not validated to initiate removal of the potentially conceptually similar term from the onomasticon.

11. The method of claim 9, further comprising:
  determining that the potentially conceptually similar term is validated; and
  reporting the potentially conceptually similar term to a graph matcher.

12. The method of claim 9, further comprising:
  determining whether the potentially conceptually similar term is validated;
  if the potentially conceptually similar term is validated, reporting the potentially conceptually similar term to a graph matcher; and
  if the potentially conceptually similar term is not validated, initiating removal of the potentially conceptually similar term from the onomasticon.

13. A computer-readable non-transitory medium having computer-executable instructions, when executed by a computer configured to:
  receive a plurality of attributes associated with a concept type of a document conceptual graph;
  receive a potentially conceptually similar term from an onomasticon corresponding to the concept type; and
  validate the potentially conceptually similar term according to the plurality of attributes, the validating comprising:
    determining, from the received attributes, a percentage of the received attributes that map to the potentially conceptually similar term;
    determining that the potentially conceptually similar term is conceptually similar to the concept type if the determined percentage is equal to or greater than a predetermined percentage; and
    determining that the potentially conceptually similar term is not conceptually similar to the concept type if the determined percentage is less than the predetermined percentage.

14. The computer-readable medium of claim 13, the instructions further configured to: report that the potentially conceptually similar term is not validated to initiate removal of the potentially conceptually similar term from the onomasticon.

15. The computer-readable medium of claim 13, the instructions further configured to:
  determine that the potentially conceptually similar term is validated; and
  report the potentially conceptually similar term to a graph matcher.

16. The computer-readable medium of claim 13, the instructions further configured to:
  determine whether the potentially conceptually similar term is validated;
  if the potentially conceptually similar term is validated, report the potentially conceptually similar term to a graph matcher; and
  if the potentially conceptually similar term is not validated, initiate removal of the potentially conceptually similar term from the onomasticon.

* * * * *